United States Patent
Hulett (10) Patent No.: US 9,291,337 B1
(45) Date of Patent: Mar. 22, 2016

(54) LED DENT REPAIR AND DETAIL LIGHT

(71) Applicant: William L. Hulett, Buffalo, MN (US)

(72) Inventor: William L. Hulett, Buffalo, MN (US)

( * ) Notice: Subject to any disclaimer, the term of this patent is extended or adjusted under 35 U.S.C. 154(b) by 0 days.

(21) Appl. No.: 14/543,882

(22) Filed: Nov. 17, 2014

(51) Int. Cl.
| | |
|---|---|
| *F21V 7/04* | (2006.01) |
| *F21V 21/30* | (2006.01) |
| *B21D 1/10* | (2006.01) |
| *B23Q 17/24* | (2006.01) |
| *F21K 99/00* | (2010.01) |
| *F21V 21/092* | (2006.01) |
| *F21V 23/02* | (2006.01) |
| *F21Y 105/00* | (2006.01) |

(52) U.S. Cl.
CPC . *F21V 21/30* (2013.01); *B21D 1/10* (2013.01); *B23Q 17/2404* (2013.01); *F21K 9/30* (2013.01); *F21K 9/50* (2013.01); *F21V 21/0925* (2013.01); *F21V 23/023* (2013.01); *F21Y 2105/001* (2013.01)

(58) Field of Classification Search
CPC ... G02B 6/0073; G02B 6/0068; G02B 6/0078
USPC ................................. 362/600–634
See application file for complete search history.

(56) References Cited

U.S. PATENT DOCUMENTS

| | | | |
|---|---|---|---|
| 1,569,041 | A | 1/1926 | Shay |
| 2,047,658 | A | 7/1936 | Zaiger |
| 3,240,525 | A | 3/1966 | Wood |
| 5,184,858 | A | 2/1993 | Arai |
| 5,390,093 | A | 2/1995 | Himeno et al. |
| 5,479,804 | A | 1/1996 | Cook |
| 5,515,253 | A | 5/1996 | Sjobom |
| 5,833,355 | A | 11/1998 | You et al. |
| 5,890,793 | A | 4/1999 | Stephens |
| 6,244,086 | B1 | 6/2001 | Hopf et al. |
| 6,422,724 | B1 | 7/2002 | Monteiro |
| 6,854,862 | B1 | 2/2005 | Hopf |
| 6,957,561 | B1 | 10/2005 | Contreras |
| 7,011,420 | B2 | 3/2006 | Cok |
| 7,104,108 | B2 | 9/2006 | Roche |
| 7,140,754 | B2 | 11/2006 | Thuma et al. |
| 7,182,490 | B2 | 2/2007 | Hsu |
| 7,210,818 | B2 | 5/2007 | Luk et al. |
| 7,572,046 | B2 | 8/2009 | Mai |
| 7,581,850 | B2 | 9/2009 | Liao |
| 7,648,259 | B1 | 1/2010 | Lin |
| 7,780,318 | B2 | 8/2010 | Xiao et al. |
| 7,922,372 | B2 | 4/2011 | Li |
| 8,021,024 | B2 | 9/2011 | Huang |
| 8,033,681 | B2 | 10/2011 | Brass et al. |
| 8,038,320 | B2 | 10/2011 | Sloan et al. |

(Continued)

*Primary Examiner* — William Carter
(74) *Attorney, Agent, or Firm* — Albert W. Watkins (57) ABSTRACT

A paintless dent removal LED light module has a plurality of selectively illuminated LED strips. There is a small gap between a generally planar diffuser panel and the LED strips, so an image formed upon the diffuser panel has parallel bright strips separated by dark regions. The LED strips are supported upon a tray bottom surface, the tray also having a circumferential and vertically rising side wall, and a lip defining a second plane generally parallel with but displaced from the tray bottom. The diffuser panel rests upon the lip, and is secured by a band having an elastomeric exterior. The tray bottom may incorporate one or more ribs to provide additional strength and rigidity. A power supply has an entirely non-marring exterior with a supporting suction cup. A ball and socket neck having an entirely non-marring exterior mechanically and electrically couples the PDR light to the power supply.

11 Claims, 7 Drawing Sheets

(56) References Cited

U.S. PATENT DOCUMENTS

| | | |
|---|---|---|
| 8,070,306 B2 | 12/2011 | Ruud et al. |
| 8,075,152 B2 | 12/2011 | Chen et al. |
| 8,258,682 B2 | 9/2012 | Villard |
| 8,322,877 B1 | 12/2012 | Merritt |
| 8,360,616 B2 | 1/2013 | Li |
| 8,382,340 B2 | 2/2013 | Boyer et al. |
| 8,430,527 B2 | 4/2013 | Lai |
| 8,550,670 B2 | 10/2013 | Boyer et al. |
| 8,622,592 B1 | 1/2014 | Liu et al. |
| 8,636,381 B2 | 1/2014 | Huang et al. |
| 8,684,587 B2 * | 4/2014 | Kim et al. .................. 362/628 |
| 8,708,520 B2 | 4/2014 | Kubota |
| 2004/0004827 A1 * | 1/2004 | Guest ......................... 362/31 |
| 2005/0105296 A1 * | 5/2005 | French ....................... 362/485 |
| 2006/0002146 A1 * | 1/2006 | Baba .......................... 362/613 |
| 2011/0043719 A1 * | 2/2011 | Thunhorst et al. ......... 362/608 |

\* cited by examiner

LED DENT REPAIR AND DETAIL LIGHT

BACKGROUND OF THE INVENTION

1. Field of the Invention

This invention pertains generally to the field of illumination, and more particularly to a portable multiple light-emitting diode light source that is especially adapted to be adjustably supported directly upon a vehicle exterior. The invention has particular utility in the field of paintless dent removal, a specialized technique to repair dents without requiring painting the repaired area. Many different sheet metal objects may be repaired using this technique, the most common which is automobile bodies such as may have been damaged by hail or minor impacts. Other objects may be repaired as well, including without limitation, airplanes, recreational vehicles, metal trailers, boats, building siding, building doors and panels, and appliances.

2. Description of the Related Art

In the fabrication of many different apparatus, there is almost always consideration for weight, appearance, cost, strength, and durability. When all of these factors are important, appropriately finished sheet metal provides each of these benefits better than other materials. Both steel and aluminum sheet metal is surprisingly strong, readily stamped or formed to many different shapes, very light weight, and for equivalent strength, generally of lower cost than a typical plastic. When appropriate finishes are used, the sheet metal can have an extremely long life, even when fully exposed to an exterior environment. As a result, sheet metal is widely used as the surface skin on land vehicles, boats, buildings, appliances, and aircraft. To improve appearance and durability, a finish such as a paint or other coating is typically applied to the sheet metal.

As may be appreciated, for the same reasons as described above, most sheet metal is relatively thin, which helps to minimize material cost, manufacturing cost, and weight. Unfortunately, this same relatively thin sheet metal is susceptible to denting. Hail, rocks, or other small objects may fall upon or be impelled into the sheet metal. Other objects may also collide with the sheet metal. For example, objects may accidentally fall or be dropped onto the sheet metal, vehicles may accidentally bump an adjacent vehicle, shopping carts may roll across a parking lot into a vehicle, and storms may carry damaging hail or throw objects through the air.

These collisions will usually result in the visible deformation of the sheet metal. One method of repair is to simply remove damaged sheet metal and install a new replacement sheet. However, such replacement can be extremely expensive, both in the purchase of replacement parts and in the labor involved. Frequently, these replacement panels will not only need to be installed, but they will also need to be painted or otherwise refinished to match the finish of the adjacent sheet metal. Furthermore, depending upon the age and make or model, there may not even be a replacement available.

Where the finish or paint is undamaged, or only shows very minor damage, there are a number of competing options available to repair the damage. One traditional approach is to press any protrusions in, and then fill any indentation with a filler material. The filler is cured, sanded, and then painted to match the pre-existing finished surface. However, dent repair using filler is time-consuming, labor-intensive, and difficult to precisely match with the existing finish. In other words, the filler texture is generally imperfect, and will not match that of the underlying sheet metal. If the textures do not match, then for exemplary purposes the original finish may be a high gloss finish, and the texture from the filler may be a dull matte. To overcome this limitation, there are repair materials that are applied in multiple layers, such as various primer layers, with the final layer having a composition designed to cure and sand to attempt to match that of the surrounding metal finish. Unfortunately, this adds even more time and labor. Further, even when the surface finish matches, the new paint will often still be extremely difficult to match to an existing paint. While color is difficult enough, matching the more modern finishes that include metal flakes can be nearly impossible, owing to the variability in the amount of flakes in the paint at the time of original and repair application, and the variability of the orientation of the flakes in the cured paint.

Filler materials used to repair dents do not expand and contract the same way as the underlying metal. Furthermore, at the time of repair or developing later, there may be microscopic separation between the filler and sheet metal. This can lead to corrosion of the underlying metal, or cracking or separation of the filler subsequent to the repair. As a result, filler does not normally have the long term durability of the original sheet metal and finish, particularly in the more harsh climates.

Preferably, minor sheet metal dents will instead be repaired without any need to alter or reapply the surface finish. The techniques using this approach are generally referred to as paintless dent repair (PDR). PDR is accomplished by either pushing out a concave dent from the inside, pulling a concave dent from the outside using hot glue, or pushing in a convex dent from the outside. Where PDR is possible without repainting or damaging the original finish, the repair will be perfectly matched, since the original finish remains undisturbed. As long as the tools and techniques used do not harm the panel interior or exterior, the panel will remain as durable as the original panel. As a result, removing dents using paintless dent repair can be extremely effective when compared to the alternatives of either removing and replacing damaged sheet metal, or using filler and subsequent surface sanding and painting. PDR is particularly suited for the repair of hail damage, since hail often does not harm a metal finish, instead only deforming the underlying sheet metal.

Various dent-removing tools and methods are illustrated and known in the prior art. Exemplary patents, the teachings and contents which are incorporated herein by reference, include: U.S. Pat. No. 5,479,804 by Cook, entitled "Tools for paintless dent repair"; U.S. Pat. No. 6,244,086 by Hopf et al, entitled "Hand tool alignment device and method"; U.S. Pat. No. 6,854,862 by Hopf, entitled "Adjustable light"; U.S. Pat. No. 6,957,561 by Contreras, entitled "Apparatus for paintless dent removal"; U.S. Pat. No. 7,104,108 by Roche, entitled "Dent repair system and method"; and U.S. Pat. No. 8,322,877 by Merritt, entitled "Remotely positionable light".

Since no filler materials are used in the paintless dent repair method, the original shape must be precisely restored for the repair to be non-detectable. In order to determine when the shape is restored, a technician will view the dents from a particular angle with the correct lighting. As those skilled in the art of PDR know, the light rays will most preferably run almost tangent to the object surface, similar to the first light of sunrise. This low angle brightly illuminates protrusions, and casts shadows into depressions. By positioning the light over a work area and adjusting the height and optionally the tilt of the light housing, the reflection of the light can be viewed across the work area. This enables the technician to easily see subtle disruptions of a surface.

Most preferably, there will be a bright region and an adjacent shadow created by the light source. It is at this transition of bright to dim that the technician will typically view the sheet metal surface. This makes positioning the light source more critical, to get this transition illuminating a particular dent. Since the light from a fluorescent source tends to be diffuse, and since the tubes tend to be relatively large, the light source tubes are typically positioned on the opposite side of a vehicle from the technician. This greater distance helps to accommodate the large tubes and diffusion of the fluorescent phosphors, but unfortunately forces the technician to move back and forth across this distance to reposition the light stand. While this may be minor for the repair of a single dent, when a vehicle has been hit many times by hail, this added time moving back and forth to readjust the light can be extremely time-consuming and frustrating. Furthermore, prior art light stands such as illustrated by Hopf in the '862 patent and Merritt, each incorporated herein above, are very large and clumsy, and also as noted undesirably difficult since the light source is generally some distance from the technician. There is a serious risk of damaging the vehicle finish if the light source is accidentally bumped or tipped, owing to the size and weight of the lights. Furthermore, these stands are only useful for passenger vehicles, and are not well adapted to other types of vehicles, or for other non-vehicular applications that could otherwise benefit from PDR.

As noted, one of the challenges of an ideal PDR light source is the sharp transition from light to dark. As the '862 patent by Hopf illustrates, an opaque strip may be run down the center between two fluorescent tubes. However, and as noted, the tubes are large, the light emanating therefrom diffuse, and the resulting fixture undesirably large.

A number of other patents illustrate various light modules, the teachings and contents of each which are incorporated herein by reference: U.S. Pat. No. 5,390,093 by Himeno et al, entitled "Illuminating display device for use with a mosaic panel"; U.S. Pat. No. 5,890,793 by Stephens, entitled "Portable luminescent lighting system"; U.S. Pat. No. 7,210,818 by Luk et al, entitled "Flexible LED lighting strip"; U.S. Pat. No. 7,780,318 by Xiao et al, entitled "Flood lamp assembly having a reinforced bracket for supporting a weight thereof"; U.S. Pat. No. 7,922,372 by Li, entitled "LED street lamp"; U.S. Pat. No. 8,021,024 by Huang, entitled "LED lamp"; U.S. Pat. No. 8,038,320 by Sloan et al, entitled "Packaging for lighting modules"; U.S. Pat. No. 8,070,306 by Ruud et al, entitled "LED lighting fixture"; U.S. Pat. No. 8,075,152 by Chen et al, entitled "Hermetic light-emitting device"; U.S. Pat. No. 8,258,682 by Villard, entitled "High thermal conductivity packaging for solid state light emitting apparatus and associated assembling methods"; U.S. Pat. No. 8,360,616 by Li, entitled "Method for installing a secondary optical lens on a LED street lamp"; U.S. Pat. No. 8,382,340 by Boyer et al, entitled "Interchangeable lighting"; U.S. Pat. No. 8,430,527 by Lai, entitled "Illuminating device and method for manufacturing the same"; U.S. Pat. No. 8,550,670 by Boyer et al, entitled "Interchangeable lighting"; and U.S. Pat. No. 8,622,592 by Liu et al, entitled "LED lamp with radiator and method for manufacturing the same". However, these fail to teach how a module might be constructed to overcome the limitations of the prior art PDR illumination sources. One of the issues with LED light sources is the lens affixed to the actual diode. This lens determines the pattern of light emanating from the LED, and will typically have a relatively high dispersion angle. In standard illumination applications, this wide dispersion angle is beneficial, since the LED can then be used to illuminate a large area. For those applications requiring more focused light, those skilled in the art of illumination will provide additional lenses adjacent to the LEDs.

Exemplary patents that illustrate various LED arrays with one or more adjacent lenses, the teachings and contents which are incorporated herein by reference, include: U.S. Pat. No. 5,515,253 by Sjobom, entitled "L.E.D. light assembly"; U.S. Pat. No. 5,833,355 by You et al, entitled "Led illuminated lamp assembly"; U.S. Pat. No. 7,011,420 by Cok, entitled "Planar directed light source"; U.S. Pat. No. 7,572,046 by Mai, entitled "Structure of optic film"; U.S. Pat. No. 7,581,850 by Liao, entitled "Light guide plate and backlight module using the same"; U.S. Pat. No. 8,636,381 by Huang et al, entitled "Flexible light source module"; and U.S. Pat. No. 8,708,520 by Kubota, entitled "Illumination device and electronic apparatus". Unfortunately, the design of a lens to form a suitable PDR light is undesirably complex, and in addition to cost also undesirably adds weight.

Additional patents, the teachings and contents which are incorporated herein by reference, illustrate various suction cup mounts: U.S. Pat. No. 1,569,041 by Shay, entitled "Trouble light"; U.S. Pat. No. 2,047,658 by Zaiger, entitled "Suction cup"; U.S. Pat. No. 3,240,525 by Wood, entitled "Vacuum device for handling articles"; U.S. Pat. No. 5,184,858 by Arai, entitled "Sucker for plate glass"; U.S. Pat. No. 6,422,724 by Monteiro, entitled "Portable light device for vehicles"; and U.S. Pat. No. 7,182,490 by Hsu, entitled "Structure of illumination apparatus". Unfortunately, none of these illustrate or teach a non-marring mount that would be acceptable for use with a PDR illumination source.

U.S. Pat. No. 7,140,754 by Thuma et al, entitled "Transformable flashlight apparatus" illustrates a ball and socket flexible neck extending between a power source base and light, the teachings and contents which are incorporated herein by reference. While illustrated, there is no contemplation or teaching for a completely non-marring construction as is required for acceptable use with a PDR illumination source. U.S. Pat. No. 8,033,681 by Brass et al, entitled "LED work light", the teachings and contents which are incorporated herein by reference, describes a rubber handle cover. While beneficial for the work light illustrated therein, there is no teaching for how this might be applied to a compact PDR illumination source. U.S. Pat. No. 7,648,259 by Lin, entitled "Lamp assembly" is additionally incorporated herein by reference for the teachings and contents found therein. In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is an LED light module having a plurality of spaced apart and parallel LED strips, at least some of the strips which are controlled by a switch to be selectively illuminated or dark. A small gap is provided between a diffuser panel and the plurality of LED strips, and an image is formed upon the diffuser panel of parallel bright strips separated by dark regions there between. The strips are supported upon a generally planar bottom surface of a tray, the tray having in addition an at least partially circumferential side wall and a lip defining a second plane parallel with but displaced from that of the generally planar bottom tray surface. A flat diffuser panel rests upon the lip, and is secured thereto by an elastomerically coated band. The generally planar bottom tray surface may further incorporate one or more ribs to provide additional strength and rigidity.

In a second manifestation, the invention is a PDR light module having an entirely non-marring exterior, a power supply having an entirely non-marring exterior and provided with a suction cup, and a ball and socket neck having an entirely non-marring exterior and securing the PDR light to the power supply.

In a third manifestation, the invention is a PDR light module power supply having a battery contained within a first housing, a suction cup base protruding from the first housing, and a suction cup extending from the suction cup base on a side distal to the first housing, the suction cup defining a circumference larger than the suction cup base and thereby shielding the suction cup base from contacting a planar surface, regardless of orientation of the PDR light module power supply.

OBJECTS OF THE INVENTION

Exemplary embodiments of the present invention solve inadequacies of the prior art by providing an LED light module having a plurality of spaced apart and substantially parallel LED strips. The strips may optionally be individually switch controlled, at least some of the strips which may then be selectively illuminated or dark. A small gap is provided between a generally planar diffuser panel and the plurality of LED strips, and an image is formed upon the diffuser panel of parallel bright strips separated by dark regions there between. The strips are supported upon a generally planar bottom surface of a tray, the tray having in addition an at least partially circumferential side wall and a lip defining a second plane parallel with but displaced from that of the generally planar bottom tray surface. The generally planar diffuser panel rests upon the lip, and is secured thereto by a band having an elastomeric exterior. The generally planar bottom tray surface may further incorporate one or more ribs to provide additional strength and rigidity. The resulting PDR light module has an entirely non-marring exterior. A power supply having an entirely non-marring exterior is also provided. An optional battery may be provided within the PDR light module power supply. A suction cup base protrudes from the PDR light module power supply housing, and a suction cup extends from the suction cup base. The suction cup defines a circumference larger than the suction cup base to thereby shield the suction cup base from contacting a work surface, regardless of orientation of the PDR light module power supply. A ball and socket neck having an entirely non-marring exterior mechanically and electrically secures the PDR light to the power supply.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an LED paintless dent repair and detail light that provides a plurality of rapid light to dark transitions that can be used to illuminate a wide variety of dents in a wide variety of locations on diverse work surfaces. A second object of the invention is to provide these transitions with a simple planar diffuser panel rather than a lens. A further object of the invention is to ensure that the entire paintless LED dent repair and detail light is non-marring, so that it cannot damage the paint on a painted work surface. Another object of the present invention is to enable controllable spacing between illuminated light strips by providing power switches to selectively disconnect individual LED strips, which can be used to either reduce the need to reposition the light source, or to select a better illumination pattern for a particular work surface region. A further object of the invention is to that the present invention remain small and lightweight, permitting it to be easily handled and placed, and again less likely to damage a work surface.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
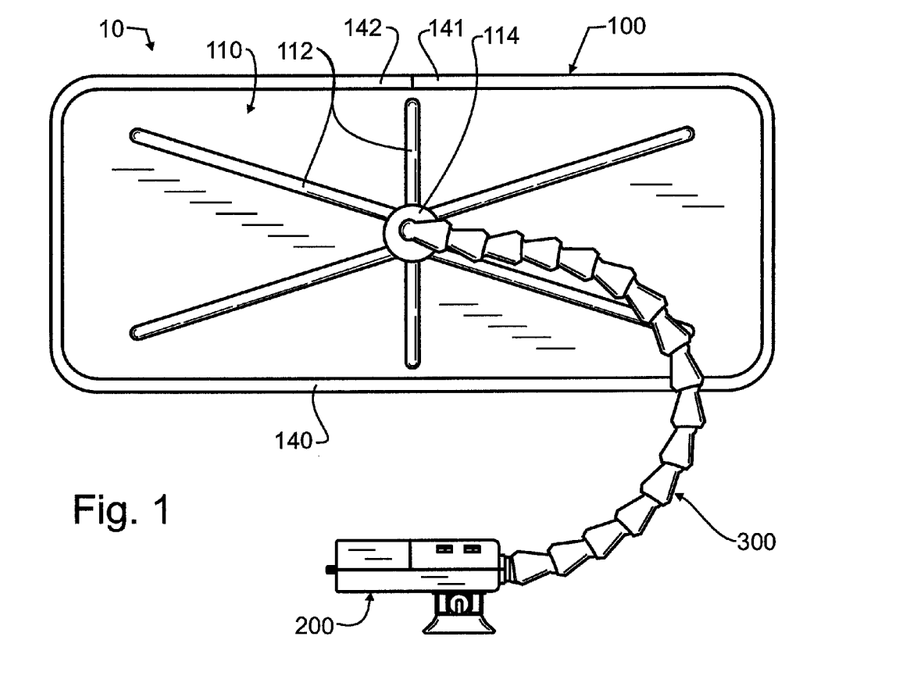
FIG. 1 illustrates a preferred embodiment paintless LED dent repair and detail light designed in accord with the teachings of the present invention from a rear elevational view.

Manifested in the preferred embodiment as illustrated for exemplary purpose in FIG. 1, the present invention provides a paintless LED dent repair and detail light 10. Three separate modules make up the paintless LED dent repair and detail light 10, including an LED light module 100, a PDR light module power supply 200, and a ball and socket neck 300 coupling LED light module 100 to PDR light module power supply 200. Most preferably, ball and socket neck 300 is sufficiently stiff to rigidly support LED light module 100 from PDR light module power supply 200, even during minor vibration or physical disruption, until a manual force sufficient to overcome the static friction within ball and socket neck 300 is applied.

Figure 2:
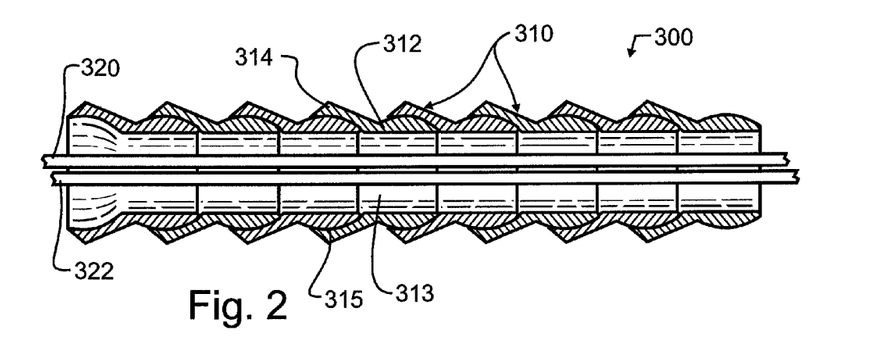
FIG. 2 illustrates a preferred embodiment neck used in the preferred embodiment paintless LED dent repair and detail light of FIG. 1 from a vertical sectional view.

Ball and socket neck 300, illustrated in greater detail in FIG. 2, will for exemplary purposes comprise a plurality of repeating neck sections 310, each having a ball portion 312 which defines a somewhat spherical exterior, and a socket portion 314 defining a somewhat spherical interior that is designed to securely snap or couple about the spherical exterior of ball portion 312. The coupling between ball portion 312 and socket portion 314 defines a bearing surface 315 which allows motion, but which also provides a static co-efficient of friction great enough to support mild loads thereupon. Each repeating neck section 310 will also define an interior passage 313 through which any appropriate wiring such as wires 320, 322 may pass. These wires 320, 322 provide connection of electrical power between LED light module 100 and PDR light module power supply 200.

In preferred embodiment paintless LED dent repair and detail light 10, ball and socket neck 300 is fabricated from a plastic that is inherently non-marring to ordinary sheet metal finishes and preferably relatively light in weight. While a plastic material is preferred, ball and socket neck 300 may alternatively be fabricated from a flexible metal conduit, and provided with a non-marring sleeve, a non-marring coating, or another flexible and protective covering; or may be fabricated from a wire-reinforced non-marring sleeve or material, whereby the wire provides static rigidity and manual repositioning. Other combinations of materials may also be used to achieve this desirable combination of rigidity and manual repositioning.

Figure 3:
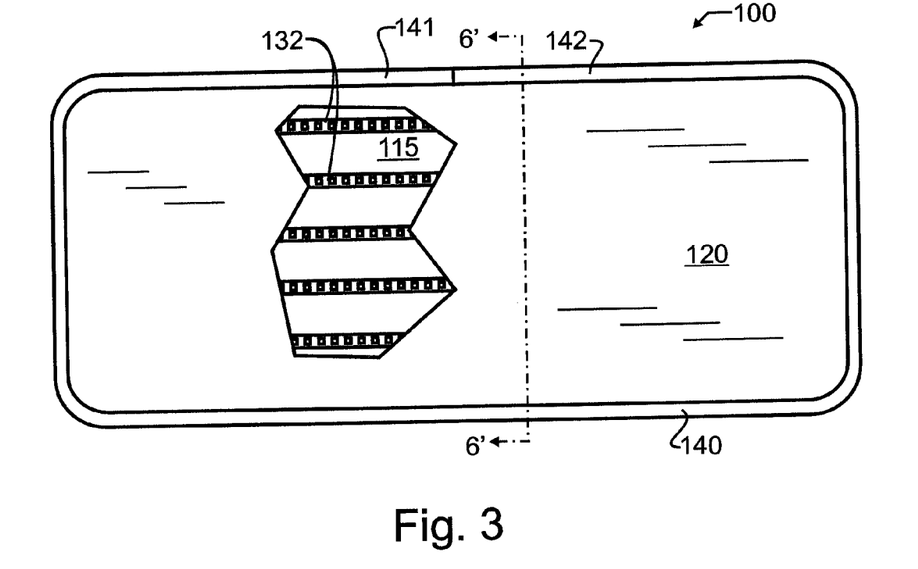
FIG. 3 illustrates a preferred embodiment LED light module having a plurality of spaced apart and parallel LED strips used in the preferred embodiment paintless LED dent repair and detail light of FIG. 1 from a front elevational view.
Figure 4:
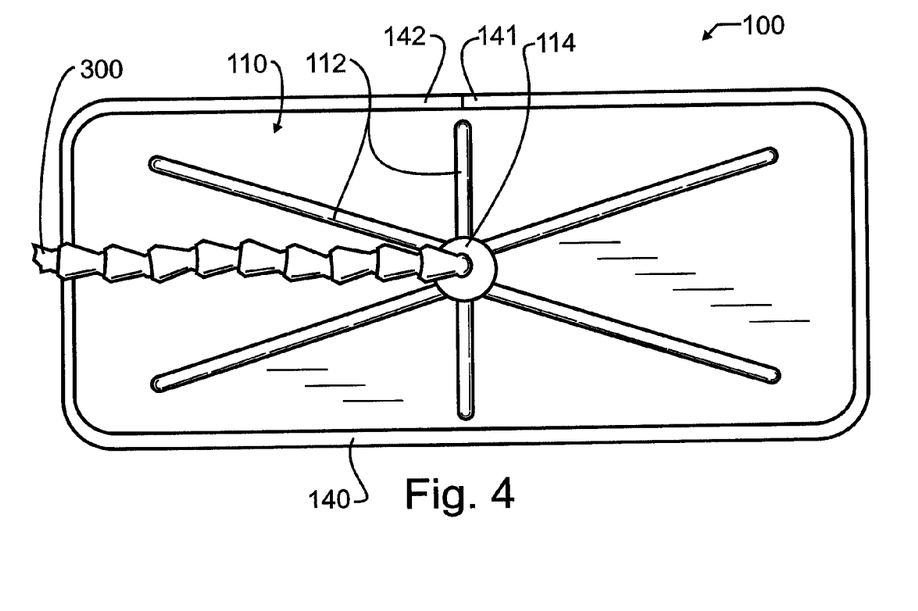
FIG. 4 illustrates the preferred embodiment LED light module of FIG. 3 from a rear elevational view.
Figure 5:
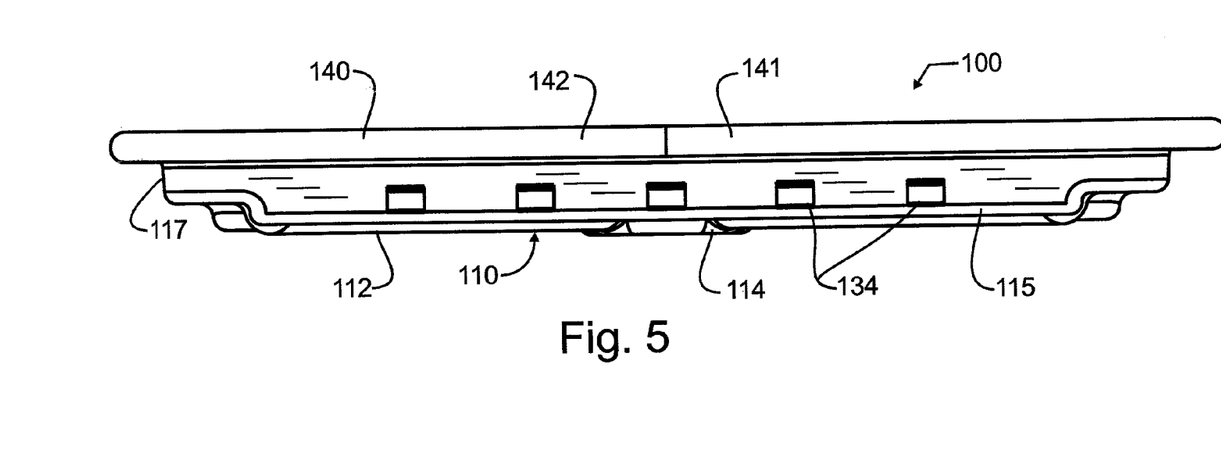
FIG. 5 illustrates the preferred embodiment LED light module of FIG. 3 from a top view.

LED light module 100 has a tray 110 having a generally planar bottom surface 115, and may include one or more optional ribs 112 to provide additional strength and rigidity. The use of ribs 112 allows a thinner and lighter tray 110 to be constructed that retains the necessary strength and rigidity to maintain a flat bottom surface 115. One particularly desirable fabrication technique is vacuum thermoforming of sheet plastic, and in such instance, suitable ribs or other suitable reinforcement technique is essential to maintain the shape and geometry of LED light module 100.

Figure 6:
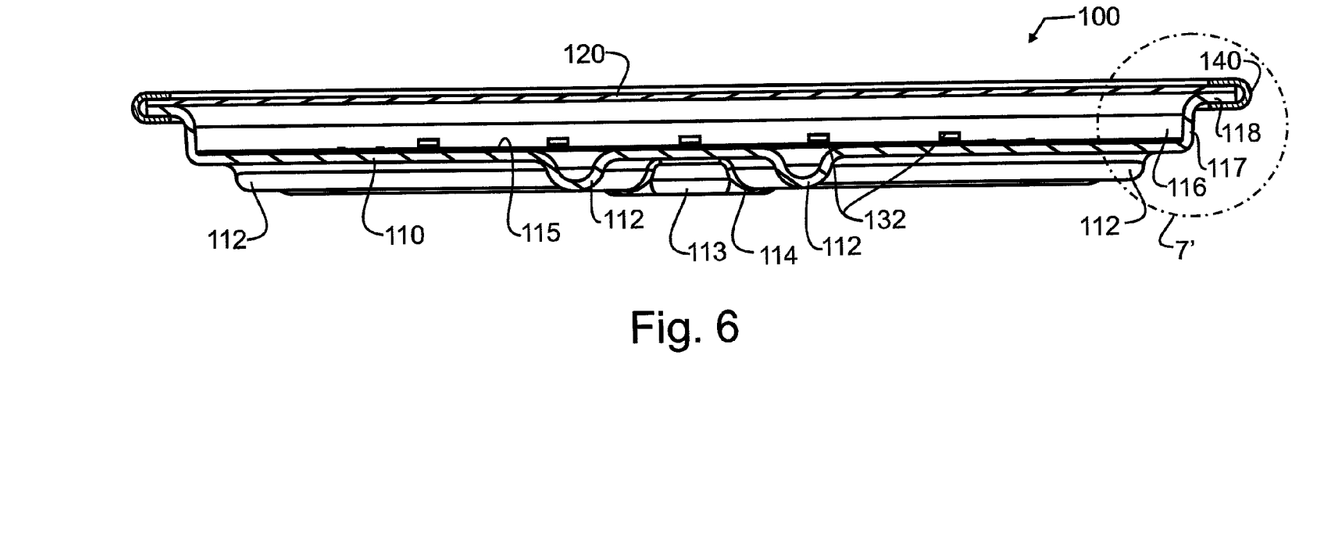
FIG. 6 illustrates the preferred embodiment LED light module of FIG. 3 from a sectional view taken along section line 6' of FIG. 3.
Figure 7:
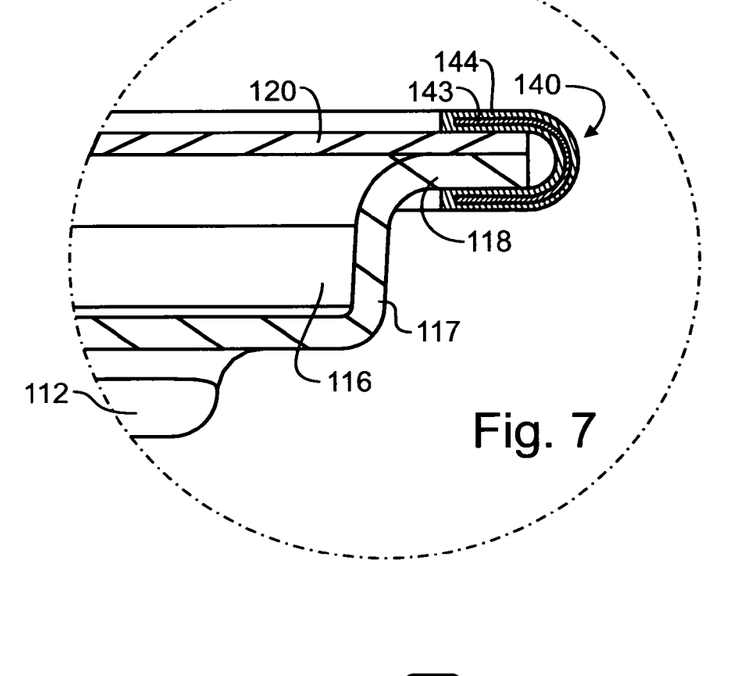
FIG. 7 illustrates the preferred embodiment LED module of FIG. 3 by an enlarged view taken along line 7' of FIG. 6.
Figure 8:
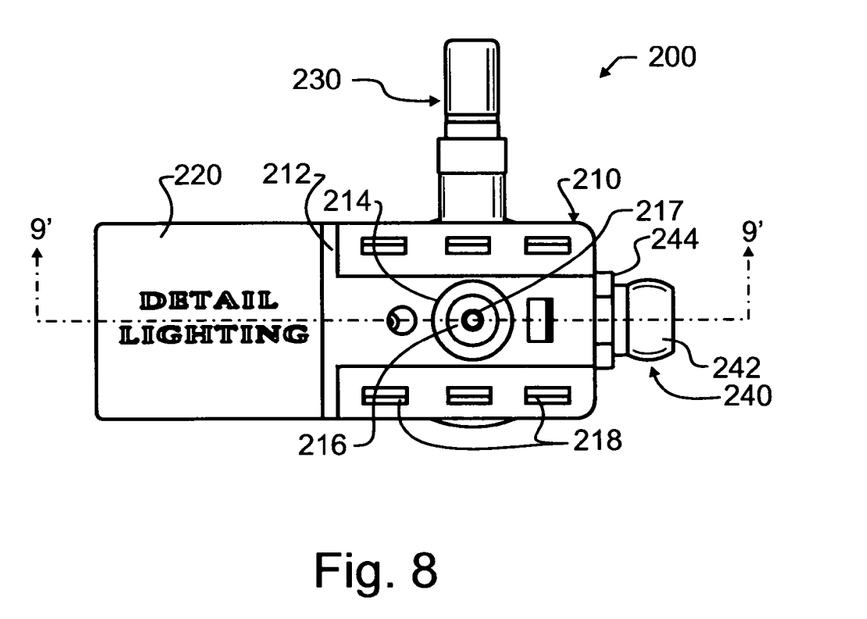
FIG. 8 illustrates a preferred embodiment power supply used in the preferred embodiment paintless LED dent repair and detail light of FIG. 1 from a top view.

Tray 110 also is provided with an at least partially circumferential side wall 117 and a lip 118 defining a second plane generally parallel with but displaced from that of the generally planar bottom tray surface 115. Side wall 117 in the preferred embodiment is nearly vertical, and this quick directional transition also helps to provide structural rigidity, much in the way that corrugations strengthen corrugated cardboard. However, with different materials and/or fabrication techniques, different angles may be used between bottom surface 115 and side wall 117. Further, while side wall 117 is illustrated as a continuous wall extending entirely around the perimeter of bottom surface 115, there may optionally be provided openings, gaps, vents, and other features as may be desired by a designer.

A neck coupling 114 may be provided that may, for exemplary purposes, include a neck ball 113 providing flexible coupling with ball and socket neck 300. Nevertheless, it will be understood that this connection between ball and socket neck 300 and tray 110 may be a permanent and rigid connection as well, owing to the flexibility already provided by ball and socket neck 300.

A diffuser panel 120 preferably covers tray 110, and thereby defines an inner chamber 116 within which a plurality of spaced apart and parallel LED strips 132 may be mounted. Diffuser 120 may comprise a variety of suitable materials, for exemplary purposes only and not solely limiting thereto comprising a frosted, opaque, or translucent plastic sheet. Exemplary materials are the well-known white acrylic sheets used presently to cover and diffuse light from fluorescent fixtures, and clear or white polycarbonate sheet that may be provided with a thin vinyl or other similar covering or coating. The use of a plastic sheet once again is preferred to keep the weight of LED light module 100 low, to reduce the strain on ball and socket neck 300 and to reduce the demands on suction cup 250 when affixed to a surface. The diffusing feature may be provided intrinsically to panel 120, or may be provided as a coating, covering, finish, surface treatment, or with any other suitable technique.

While a variety of techniques may be used to couple diffuser 120 with tray 110, FIG. 7 illustrates a preferred coupling. The generally planar diffuser panel 120 rests upon lip 118, and in the preferred embodiment is secured thereto by a band 140 having an elastomeric exterior 144. Band 140 may, for exemplary purposes, have an interior 143 formed from a deformable material such as a malleable metal. In this case, band 140 can be cut to length to define a first end 141 and a second end 142. Band 140 is then wrapped about the perimeter of lip 118 and panel 120, bringing first end 141 adjacent to second end 142. Band 140 is next pinched about lip 118 and panel 120 to permanently retain the two together. The elastomeric exterior 144 not only helps to secure panel 120 to lip 118, but also provides a soft and non-marring contact surface in the event that preferred embodiment paintless LED dent repair and detail light 10 somehow is dropped or scraped against an object being worked upon.

In preferred embodiment LED light module 100, lip 118 and panel 120 are affixed simply by pinching band 140 and thereby deforming malleable interior 143. The attachment may additionally or alternatively include the use of adhesives, bonding techniques such as ultrasonic bonding, or any other suitable means to secure or affix lip 118 and panel 120 together.

While the use of a simple planar lip 118 is preferred, in an alternative embodiment a three-sided groove or channel may be provided, panel 120 inserted therein, and then secured thereto. In the case of a three-sided groove or channel, a spline or other fastener may be inserted subsequent to panel 120 being inserted to secure panel 120 therein. In such case, the three-sided groove or channel must be sufficiently rigid to allow substantial compression to adequately secure panel 120, or other adhesives or other bonding or affixing techniques should be used in addition to the spline. As may be apparent then, while the preferred embodiment lip 118 is most preferred and extremely beneficial for vacuum thermoforming, other lip geometries that perform equivalently in securing panel 120 to tray 110 in a manner that precisely maintains the spacing between LED strips 132 and panel 120 are contemplated and incorporated herein as alternative embodiments.

By securely affixing lip 118 and panel 120, the resultant strength and rigidity of preferred embodiment LED light module 100 is substantially increased. Any flexure in tray 110 that would create a tension in panel 120 is thereby prevented, since panel 120 preferably will not readily stretch. Similarly, panel 120 will act synergistically to prevent any twisting in tray 110, and tray 110 will likewise act synergistically to prevent any twisting in panel 120. Once again, this allows lighter weight materials to be used for fabrication, and lower cost manufacturing techniques such as vacuum thermoforming of sheet plastic. While alternative fabrication techniques are known to produce lightweight and very strong objects, such as the formation of carbon fiber composites, these alternative fabrication techniques are significantly more expensive.

Within LED light module 100, LED strips 132 may optionally be individually controlled by switches 134. In this case, at least some of LED strips 132 may then be selectively illuminated or dark. A small gap is provided between a generally planar diffuser panel and the plurality of LED strips, and an image is formed upon the diffuser panel of parallel bright strips separated by dark regions there between. The size of this small gap is in part a function of the internal LED lenses used within LED strips 132, and so will require a determination at the time of design of LED light module 100. However, the gap must remain small enough to avoid a spanning of illumination across diffuser panel 120, and instead in a preferred embodiment only be sufficient to permit diffusion of light from adjacent LEDs within each of strips 132, to thereby preserve the parallel bright strips separated by dark regions, or in another embodiment only permit diffusion from adjacent LEDs within or from immediately adjacent strips 132. By using switches 134, the particular spacing between these parallel bright strips separated by dark regions can be easily controlled. While not separately illustrated, a rheostat or other control device may be provided to control the intensity of one or more of the LED strips 132 as well, such as to adjust for ambient lighting or for other benefit.

Like LED light module 100, PDR light module power supply 200 has an entirely non-marring exterior. A suction cup 250, which may have a pump 230 such as illustrated in the Wood and Arai patents incorporated herein above by reference, is preferably used to obtain a secure connection to a work surface such as an automobile body. A coupling 254 may attach to power supply housing 210 through shaft 217, visible in FIG. 9, and may be anchored using a nut, swage, or any other fastener accessible through dimple 214. Coupling 254 may for exemplary purpose encompass pump shaft 219 and suspend suction cup 250 having an elastomeric flare 252 therefrom. Elastomeric flare 252 preferably extends well beyond coupling 254, to ensure that any physical contact is blunted by flare 252.

Figure 9:
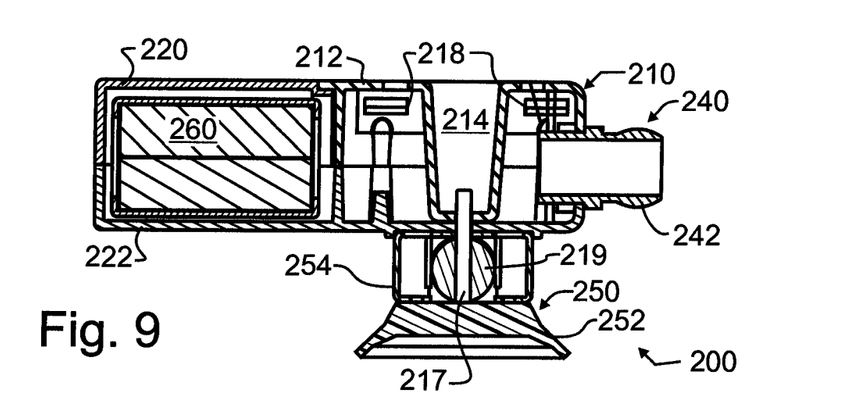
FIG. 9 illustrates the preferred embodiment power supply of FIG. 8 from a sectional view taken along section line 9' of FIG. 8.
Figure 10:
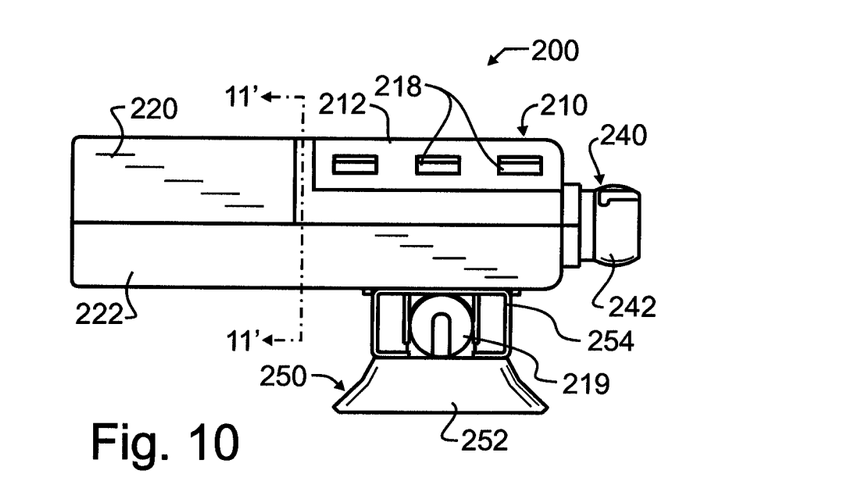
FIG. 10 illustrates the preferred embodiment power supply of FIG. 8 from an elevational view similar to that of FIG. 1.
Figure 11:
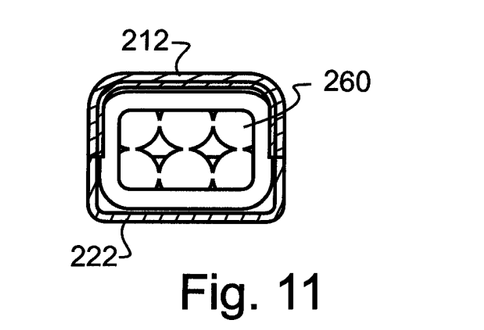
FIG. 11 illustrates the preferred embodiment power supply of FIG. 8 from a sectional view taken along section line 11' of FIG. 10.
Figure 12:
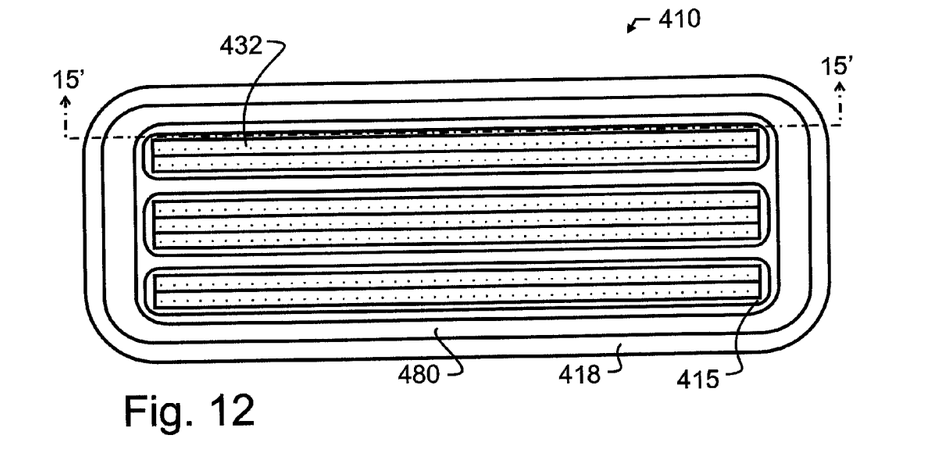
FIGS. 12, 13, and 14 illustrate an alternative embodiment LED light module from top plan view, side elevational view, and bottom plan view, respectively.

Power supply 200 has a housing 210 that may, for exemplary purposes only, and not limiting solely thereto, comprise three sections. A base 222 provides the primary support for suction cup 250, and removable therefrom is a battery cover 220 which houses battery 260 therein. Battery cover 220 will preferably snap fit into base 222 and forward cover 212. Forward cover 212 will likewise also have a plurality of openings through which snaps 218 may pass to thereby couple forward cover 212 to base 222. Any suitable techniques of fastening may be used, and instead of the snap-together construction in preferred PDR light module power supply 200, glue or other means may be used.

A quick connect 240 is preferably provided having a ball 242 onto which ball and socket neck 300 may attach through a socket portion 314, though again any suitable fastening technique may be used.

The preferred embodiment paintless LED dent repair and detail light 10 has an entirely non-marring exterior, and is of low weight and rigid construction, permitting it to be easily handled and placed, all while not presenting any risk of damaging a work surface. In addition, and with the proper, precise and repeatable location of diffuser panel 120 with respect to LED strips 132, paintless LED dent repair and detail light 10 provides a plurality of rapid light to dark transitions that can be used to illuminate a wide variety of dents in a wide variety of locations on diverse work surfaces. Controllable spacing between illuminated light strips 132 is achieved by providing power switches 134 to selectively disconnect individual LED strips 132, which can then be used to either reduce the need to reposition the light source, or to select a better illumination pattern for a particular work surface region. This combination of features allows preferred embodiment paintless LED dent repair and detail light 10 to be attached directly upon a work surface, close to a technician working on that surface.

Several embodiments of LED light modules 100, 400 designed in accord with the present invention have been illustrated in the various figures. The embodiments are distinguished by the hundreds digit, either 1 for the preferred embodiment or 4 for the alternative embodiment, and various components within each embodiment designated by the ones and tens digits. However, many of the components are alike or similar between embodiments, so numbering of the ones and tens digits have been maintained wherever possible, such that identical, like or similar functions may more readily be identified between the LED light module embodiments 100, 400. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 13:
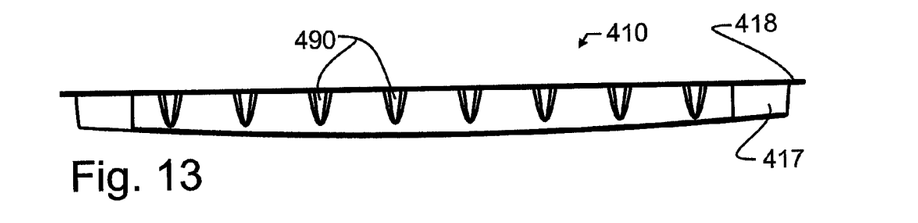
Figure 14:
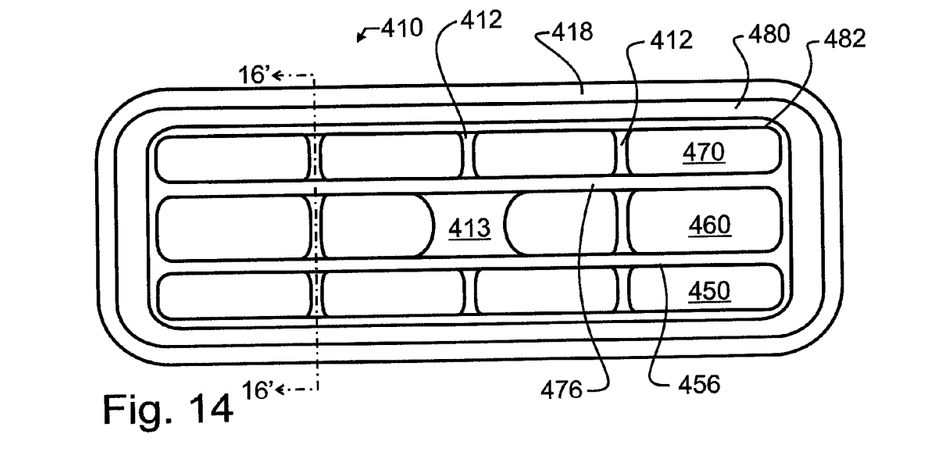
Figure 15:
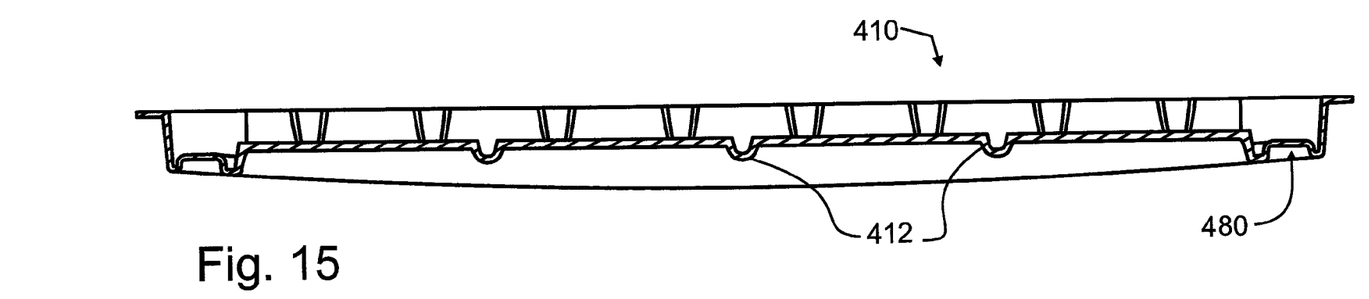
FIG. 15 illustrates the alternative embodiment LED light module of FIGS. 12-14 from a sectional view taken along section line 15' of FIG. 12.
Figure 16:
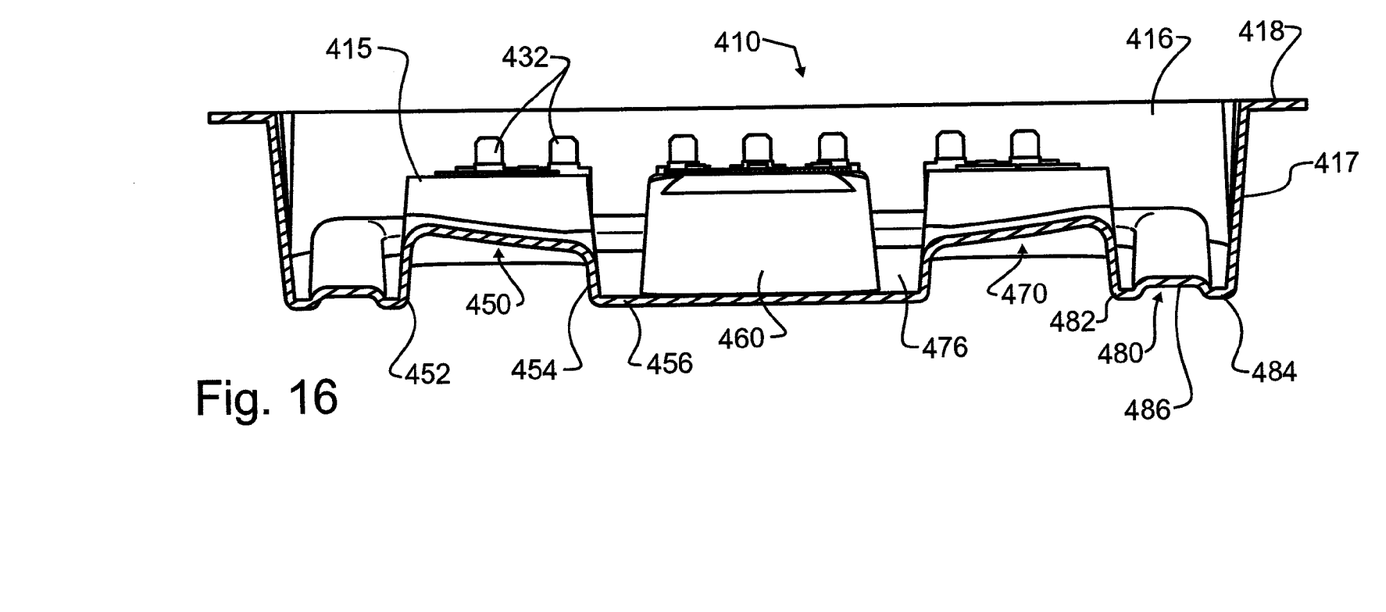
FIG. 16 illustrates the alternative embodiment LED light module of FIGS. 12-14 from a sectional view taken along section line 16' of FIG. 14.

FIGS. 12-16 illustrate alternative embodiment LED light module 400, which is functionally identical to LED light module 100, but which has been designed to be larger. Owing to the increased size, a number of additional features have been provided to obtain the desired strength and rigidity, and yet preserve low cost fabrication and low weight. In alternative embodiment LED light module 400, three primary support ridges 450, 460, 470 are provided that define the base 415 upon which LED strips 432 are placed. These ridges each have a set of sharp directional transitions, such as substantially vertical edges 452, 454 illustrated in FIG. 16. Between these support ridges 450, 460, 470 there are generally horizontal valleys 456, 476. As noted herein above, such directional changes provide substantial stiffening. While such support ridges 450, 460, 470 and valleys 456, 476 thereby provide substantial stiffening along the length of these support ridges 450, 460, 470, there is also a need for stiffening along an axis transverse thereto. This has been provided through a plurality of ridges 412. Additional stiffening is obtained from the base outer rim 480, which also has a pair of valleys 482, 484, and an elevated ridge 486. Finally, additional stiffeners 490 are formed at any desirable locations in side wall 417. As may be understood, stiffeners 490 provide substantially increased stiffness in a vertical direction as illustrated in FIG. 13. Where ridges 412, support ridges 450, 460, 470, and stiffeners 490 are all used in combination, such as found in alternative embodiment LED light module 400, this provides orthogonal three-axis stiffening.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A Light Emitting Diode (LED) light module, comprising:
a tray having a generally planar surface, an at least partially circumferential side wall, and a lip defining a second plane generally parallel with but displaced from that of said generally planar tray surface;
a plurality of spaced apart and generally parallel LED strips supported upon said generally planar tray surface;

a generally planar diffuser panel parallel with, secured to, and supported by said tray lip; and a small gap between said diffuser panel and said plurality of LED strips of dimension to form an image output from said diffuser panel having parallel bright strips separated by dark regions there between.

2. The LED light module of claim 1, further comprising a band having a deformable interior and an elastomeric exterior, said band wrapped and pinched about and thereby securing said generally planar diffuser panel to said tray lip.

3. The LED light module of claim 2, wherein said band further comprises an elastomerically coated malleable metal.

4. The LED light module of claim 3, wherein said band further comprises a U-shaped cross-section, with a first generally straight leg of said U-shaped band cross-section parallel to and immediately adjacent a diffuser major surface, a second generally straight leg of said U-shaped band parallel to and immediately adjacent a lip major surface; and a curved base of said U-shaped cross-section defining a perimeter about said diffuser and said lip.

5. The LED light module of claim 1, wherein said generally planar tray surface further comprises at least one rib providing additional strength and rigidity.

6. The LED light module of claim 5, wherein said at least one rib further comprises a plurality of ribs radiating from adjacent to a center of generally planar tray surface towards a perimeter thereof adapted to provide orthogonal three-axis stiffening of said generally planar tray surface.

7. The LED light module of claim 5, wherein said at least one rib further comprises a plurality of ridges and stiffeners adapted to provide orthogonal three-axis stiffening of said generally planar tray surface.

8. The LED light module of claim 1, wherein said generally planar tray surface is adjacent to a bottom of said tray, and distal to said generally planar diffuser panel.

9. The LED light module of claim 1, wherein at least one of said plurality of spaced apart and generally parallel LED strips is controlled by a switch to be selectively illuminated or dark and thereby selectively control particular spacing between said parallel bright strips.

10. The lightweight and rigid LED light module of claim 1, wherein said tray having said generally planar surface, said at least partially circumferential side wall, and said lip further comprises a unitary structure.

11. A lightweight and rigid Light Emitting Diode (LED) light module, consisting essentially of:

a tray having a generally planar surface;

a plurality of spaced apart and generally parallel LED strips supported upon said generally planar tray surface;

a generally planar diffuser panel parallel with said tray generally planar surface; and an affixer securing said generally planar diffuser panel to said tray;

said tray, said affixer, and said generally planar diffuser panel defining an exterior shell encompassing said plurality of spaced apart and generally parallel LED strips and defining a small gap between said diffuser panel and said plurality of LED strips of dimension to form an image upon and output from said diffuser panel of parallel bright strips separated by dark regions there between.

* * * * *